F. D. PLATTER, DEC'D.
J. G. ROBERTS, ADMINISTRATOR.
CLUTCH MECHANISM.
APPLICATION FILED DEC. 10, 1906.
921,628.
Patented May 11, 1909.
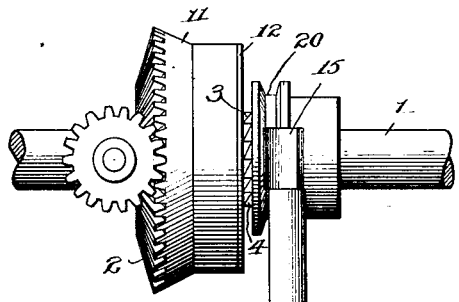
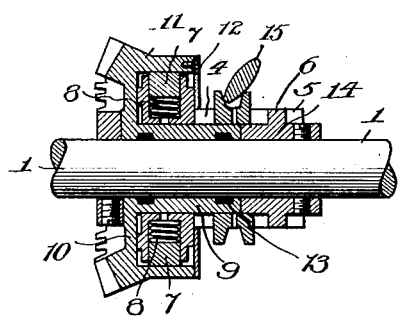
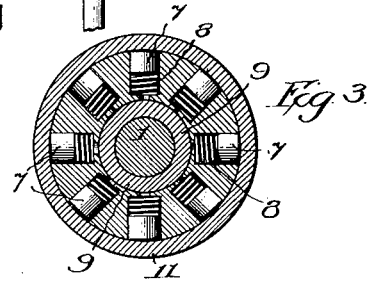
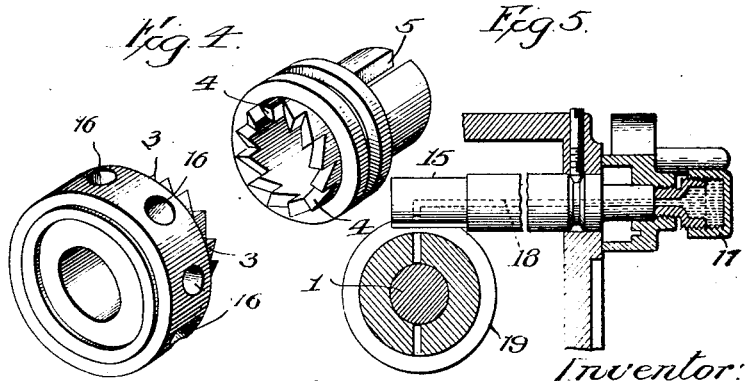
Witnesses:
Irving Macdonald
Alfred H. Moore
Inventor:
John G. Roberts, administrator of
the estate of Frank D. Platter, dec'd,
by Barton, Launer & Folk,
Attys

UNITED STATES PATENT OFFICE.

JOHN G. ROBERTS, OF CHICAGO, ILLINOIS, ADMINISTRATOR OF FRANK D. PLATTER, DECEASED, ASSIGNOR TO WESTERN ELECTRIC COMPANY, OF CHICAGO, ILLINOIS, A CORPORATION OF ILLINOIS.

CLUTCH MECHANISM.

No. 921,628.  Specification of Letters Patent.  Patented May 11, 1909.

Original application filed June 10, 1905, Serial No. 264,570. Divided and this application filed December 10, 1906.
Serial No. 347,124.

*To all whom it may concern:*

Be it known that FRANK D. PLATTER, deceased, late a citizen of the United States, residing at Chicago, in the county of Cook and State of Illinois, was the inventor of a certain new and useful Improvement in Clutch Mechanisms, of which the following is a full, clear, concise, and exact description.

This invention relates to clutch mechanism, and has for its object to provide improved means for controlling the connection of a driving shaft with mechanism to be driven.

Generally speaking, the invention contemplates the provision of two clutch members, one of said members being loosely mounted upon a driving shaft and in frictional engagement with a driving wheel, while the other member of the clutch is splined to rotate with the driving shaft. With this arrangement, when the clutch members are brought into engagement, the driving wheel slips upon the clutch members with which it is in frictional engagement, and said driving wheel is gradually brought up to speed. The result is very advantageous, since the said clutch mechanism may be conveniently employed with machines which must have a gradual acceleration of speed up to the maximum point. The arrangement described also prevents injury to the clutch members when they are thrown into engagement.

I will describe the invention by reference to the accompanying drawings, which represent a clutch embodying the invention, reserving, however, for the annexed claims a statement of the parts, improvements and combinations which I consider novel.

In the drawings, Figure 1 is a plan view of a clutch embodying the invention; Fig. 2 is a longitudinal sectional view of the clutch; Fig. 3 is a cross section through the driving wheel and one member of the clutch; and Fig. 4 is a perspective view showing the two clutch members in position for engagement. Fig. 5 is a sectional view showing the rocking lever engaging the movable member of the clutch, with the grease cup at its free end.

The same numerals of reference indicate like parts wherever they are shown.

The clutch mechanism is shown mounted upon a driving shaft 1 in position to control the connection of said shaft with a driving wheel 2. A pair of clutch members 3, 4, are provided, the member 3 being loosely mounted upon the shaft and inclosed by the hollow driving wheel 2, whose inner surface lies in frictional engagement with the periphery of said member 3. The other member 4 is splined to rotate with the shaft 1, and is adapted to be moved along said shaft into or out of engagement with its mate, the two members 3, 4, having gear teeth adapted to mesh. Said member 4 may be provided with longitudinal slots 5 therein, in which keys 6 secured to the shaft are adapted to ride to spline the clutch member to the shaft. The clutch member 3 is provided with a number of holes 16, 16, in its periphery, in which are mounted frictional pins 7, 7, preferably of fiber, these pins being formed at their ends with a curvature slightly greater than that of the inside surface of the driving wheel. Springs 8, 8, are located within the holes 16, 16, to bear against the pins 7, 7, and force the same outwardly against the inner surface of the wheel 2, to maintain a constant and uniform frictional engagement between the clutch member 3 and the driving wheel 2, and to take up any wear between said parts. By having the curvature of the fiber pins as indicated, it is possible to accommodate the mechanism to the wear of the pins and the consequent decrease in pressure of the springs, for, as the pins are worn away, their surface of contact increases. By this means I am enabled to obtain an almost constant frictional engagement. The driving wheel 2 may comprise a hub 9 loosely mounted upon the driving shaft, and connected by a web 10 with the outer driving shell 11, the clutch member 3 being loosely mounted upon said hub between the same and the shell 11. Said clutch member 3 may be confined within the driving wheel by a suitable plate 12. The hub 9 may be provided with a pair of annular grooves 13 in its inner surface, which may be filled with graphite or other lubricant. The keys 6 may be carried upon a collar 14 secured to the driving shaft and abutting against the end of the hub 9, said clutch member 4 being mounted to slide longitudinally upon said hub 9 and collar 14.

The free end of the rocking arm or lever, to which the handle is attached, carries a grease reservoir or cup 17, which is connected by a passage 18 leading through the rocking arm or lever 15 with the groove 20 in the collar 19 carried by clutch member 4, a passage leading to the bearing of the clutch member through holes in the bottom of the groove 20, to lubricate said groove and bearing together with the thrust bearing of member 9 against member 14. It will thus be seen that when the clutch members 3, 4, are closed by the lever 15, the driving wheel 2 will not be immediately brought up to the speed of the shaft, owing to the frictional engagement between the member 3 of the clutch and the driving wheel, but, due to the slip, the speed of said wheel will be gradually accelerated until it reaches the maximum speed.

The clutch mechanism of this invention is capable of advantageous use, for example, in connection with wire insulating machines, such as shown in the application of Frank D. Platter, Serial No. 264,570, filed June 10, 1905, of which this case is a division.

I claim:

1. The combination with a rotatable shaft, of a member loosely mounted on said shaft, a member adapted to rotate with said shaft, pins carried by one of said members and arranged to frictionally engage with said other member, the ends of said pins gradually increasing inwardly in cross-sectional area, said pins being thus provided with contact surfaces adapted to increase in area as the pins wear down, and means for bringing said members into operative engagement with each other and with said shaft.

2. In a clutch mechanism, the combination with a driving shaft, of a driving wheel loosely mounted on said shaft, clutch mechanism for connecting said wheel to said shaft, said clutch mechanism carrying pins having a frictional contact with said driving wheel, the ends of said pins gradually increasing inwardly in cross-sectional area, said pins being thus provided with contact surfaces adapted to increase in area as the pins wear down, and means for bringing the clutch mechanism into operative engagement with said driving wheel.

3. In a clutch mechanism, the combination with a driving shaft, of a pair of clutch members carried thereby, one of said members being loosely mounted upon said shaft, a driving wheel inclosing said clutch member and in frictional engagement with the periphery thereof, frictional pins movably mounted within holes in the periphery of said clutch member, springs within said holes for forcing said pins outwardly against the inner surface of said driving wheel to maintain a uniform and constant frictional contact between said clutch member and the wheel, the other clutch member being splined to said shaft, and means for controlling the engagement of said clutch members.

4. In a clutch mechanism, the combination with a driving shaft, of a pair of clutch members carried thereby, one of said members being loosely mounted upon said shaft, a driving wheel in frictional contact with said member, the other member being splined to the shaft, an annular collar carried by said member having an annular groove in the periphery thereof, said collar having a hole therein leading from said groove to the shaft, a lever for moving said last mentioned member, one end of said lever resting in said groove, said collar having an opening therein leading from the groove therein to the shaft, and a grease cup or reservoir upon the other end of said lever, said lever having a passage leading from said reservoir to said groove.

5. In a clutch mechanism, the combination with a driving shaft, of a hollow driving wheel comprising a collar loosely mounted upon the shaft, and an outer driving shell connected therewith, annular grooves in the inner surface of said collar, graphite in said grooves to serve as a lubricant, a pair of clutch members, one of said members being located within said driving wheel in frictional engagement with said collar and the outer disk, a collar abutting against said first mentioned collar and secured to the shaft, a rib upon said collar adapted to move in a longitudinal groove in the other clutch member, and means for controlling the engagement of said members.

6. In a clutch mechanism, the combination with the driving shaft, of a pair of clutch members carried thereby, one of said members being loosely mounted upon said shaft, and carrying pins having frictional contact with a driving wheel also loosely mounted on said shaft, said pins provided with contact surfaces adapted to increase in area as the pins wear down, the other clutch member being keyed to rotate with the said shaft, and means for moving said clutch members into or out of engagement.

7. In a clutch mechanism, the combination with a driving shaft, of a pair of clutch members carried thereby, one of said members being loosely mounted upon said shaft, a driving wheel inclosing said clutch member and in frictional contact with the periphery thereof, frictional pins movably mounted within holes in the periphery of said clutch member, said pins having their ends curved with a curvature less than that of the inclosed driving wheel, springs within said holes for forcing said pins outward against the inner surface of said driving wheel, to maintain a constant frictional contact between said clutch member and wheel, the outer clutch member being splined to said shaft, and means for controlling the engagement of said clutch members.

In witness whereof, I hereunto subscribe my name this 4th day of December A. D., 1906.

JOHN G. ROBERTS,
*Administrator of the estate of Frank D. Platter, deceased.*

Witnesses:
   ROY T. ALLOWAY,
   E. F. BEAUBIEN.